(12) United States Patent
Shen et al.

(10) Patent No.: US 10,464,371 B2
(45) Date of Patent: Nov. 5, 2019

(54) SILENT HUB STRUCTURE

(71) Applicant: YUAN HONG BICYCLE PARTS CO., LTD., Dapi Township (TW)

(72) Inventors: Wei-Chen Shen, Dapi Township, Yunlin County (TW); Yuen-Ting Chang, Dapi Township, Yunlin County (TW)

(73) Assignee: YUAN HONG BICYCLE PARTS CO., LTD., Yunlin County (TW)

(*) Notice: Subject to any disclaimer, the term of this patent is extended or adjusted under 35 U.S.C. 154(b) by 226 days.

(21) Appl. No.: 15/624,446

(22) Filed: Jun. 15, 2017

(65) Prior Publication Data

US 2017/0361650 A1 Dec. 21, 2017

(30) Foreign Application Priority Data

Jun. 16, 2016 (TW) .............................. 105209008 U (51) Int. Cl.
| | |
|---|---|
| *B60B 27/04* | (2006.01) |
| *B60B 27/00* | (2006.01) |
| *B60B 27/02* | (2006.01) |
| *F16D 41/18* | (2006.01) |
| *F16D 41/066* | (2006.01) |
| *F16D 27/14* | (2006.01) |

(52) U.S. Cl.
CPC ........ *B60B 27/047* (2013.01); *B60B 27/0021* (2013.01); *B60B 27/0031* (2013.01); *B60B 27/02* (2013.01); *B60B 27/023* (2013.01); *F16D 27/14* (2013.01); *F16D 41/066* (2013.01); *F16D 41/18* (2013.01); *B60B 27/026* (2013.01); *B60B 2900/131* (2013.01); *B60B 2900/133* (2013.01)

(58) Field of Classification Search
None
See application file for complete search history.

(56) References Cited

U.S. PATENT DOCUMENTS

| | | | | |
|---|---|---|---|---|
| 5,964,332 | A * | 10/1999 | King ..................... | B60B 27/023 192/46 |
| 2002/0005325 | A1 * | 1/2002 | Yamada ................. | F16D 41/067 192/38 |
| 2011/0315801 | A1 * | 12/2011 | Hayashi ............. | A01K 89/0117 242/247 |
| 2012/0285785 | A1 * | 11/2012 | Tho ......................... | F16D 41/36 192/64 |
| 2015/0211582 | A1 * | 7/2015 | Senger .................... | F16D 41/24 192/415 |
| 2015/0285318 | A1 * | 10/2015 | Lin ......................... | F16D 27/01 192/45.001 |

* cited by examiner

*Primary Examiner* — Mark A Manley (57) ABSTRACT

A silent hub structure includes a hub housing, an interlocking ring, a detent ring and a cassette base. The interlocking ring is installed inside the hub housing and has a central through-hole slot therein through which a detent ring is rotatably disposed therethrough. The through-hole slot is internally and circumferentially provided with a plurality of receiving grooves recessed at an equal distance therebetween on the internal wall. Each of these receiving grooves is disposed with a metal roller pin along the axial direction. The forward-rotating direction side of every receiving groove forms a clamping portion; a magnetic member is disposed in the interlocking ring near the clamping portion of each of the receiving groove separately, whereas the backward-rotating direction side of every receiving groove forms a releasing portion.

9 Claims, 11 Drawing Sheets

SILENT HUB STRUCTURE

BACKGROUND OF INVENTION

1. Field of Invention

The present invention relates to a hub structure, and more particularly to a silent hub structure.

2. Description of Related Art

Figure 10:
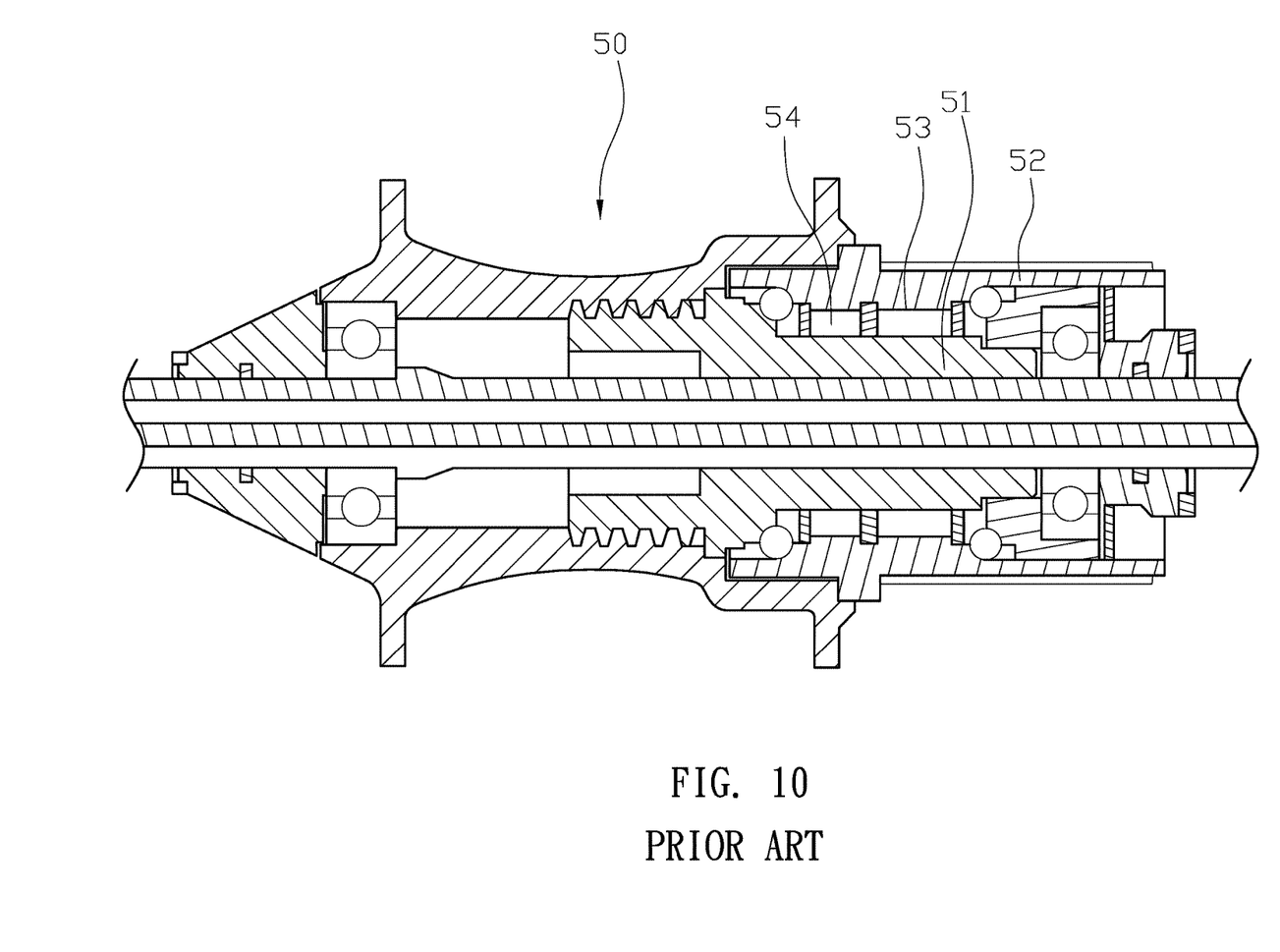
FIG. 10 is a cross-sectional view in the axial direction of the prior art.
Figure 11:
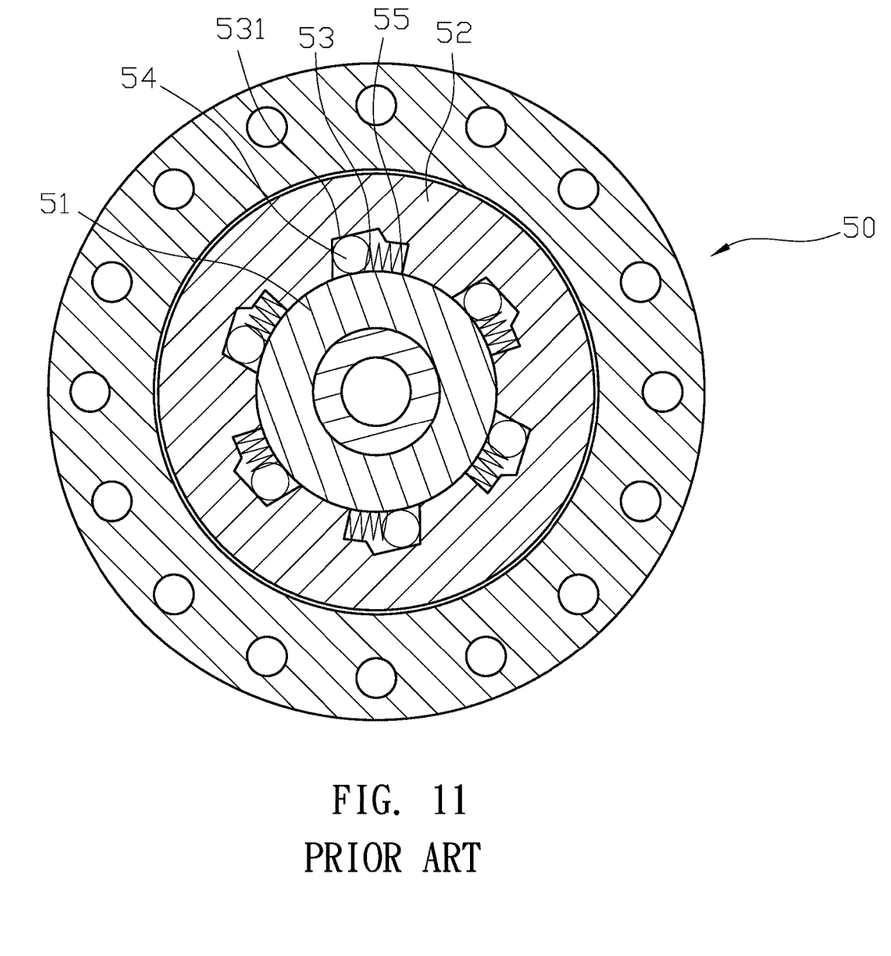
FIG. 11 is a cross-sectional view in the radial direction of the prior art.

Currently, the conventional hub for bicycles relies on the ratchet mechanism to achieve the goal of having the hub to act in a continuous linear or rotary motion in only one direction. However, such hub structure generates backlash noise during a backward motion. In order to eliminate the noise, industrial manufacturers have developed silent hubs. Please refer to the illustrations in FIG. 10 and FIG. 11. The hub 50 has a clutch device disposed between the clutch housing 51 and the cassette base 52, wherein the clutch device is composed of receiving groove 53 located inside the cassette base 52, the roller pin 54 located inside the receiving groove 53, and the elastic member 55 (as shown in FIG. 11). Furthermore, the receiving groove 53 has a contracting inclined surface and a clamping portion 531 formed at the end of the inclined surface. In use of the design, as the bicycle is pedaled, the cassette base 52 is in a forward-rotating mode; through the push against and frictional movement by the elastic member 55 inside the receiving groove 53, the roller pin 54 moves toward the direction of clamping portion 531 of the receiving groove 53 and reaches a clamping stop, forcing the cassette base 52 and the clutch housing 51 to form a complete engagement through the roller pin 54. By means of such movement, the momentum generated by pedaling is absorbed by the cassette base 52 and transferred to the clutch housing 51, in order to drive the hub 50 to rotate and the bicycle to move forward.

On the other hand, when the user slows down and steps the pedals backward, the cassette base 52 and the clutch housing 51 in rotation are moving in an opposite rotation direction and further roll out the roller pin 54 from the clamping portion 531 of the receiving groove 53 through the cassette base 52, forcing the cassette base 52 and the clutch housing 51 to be released from the engagement mode and to become rotating in idle. Since the clutch housing 51 is still in the forward-rotating move, the bicycle is sliding in a free spinning mode.

According to the aforementioned structure of the prior art, it is apparent that there are few deficiencies due to the following facts: (1) The structure of the prior art has a roller pin 54 disposed in each of the plurality of receiving groove 53 separately to provide the effect of engagement and disengagement between the clutch housing 51 and the cassette base 52. Every receiving groove 53 is installed with a elastic member 55 therein to provide the elastic effect of resetting the roller pin 54. However, the elastic member 55 is compressed to a very small scale within the much limited space provided in the receiving groove 53. Therefore, not only the volume of the elastic member 55 reduces, but also its elasticity deteriorates due to a long period of compression and will no longer be sufficient to provide the elastic resetting effect to the roller pin.

(2) In addition, the elastic member 55 in the receiving groove 53 is in contact with both the clutch housing 51 and the cassette base 52. When the cassette base 52 is released from the engagement mode with the clutch housing 51, the clutching house 51 still is rotating in idle with respect to the cassette base 52, causing the elastic member 55 to be under friction from the rotating cassette base 52. As a result, the rotation of the cassette base 52 is interfered by the resistance and heat is generated due to the friction, causing the elastic member 55 to become possible thermal embrittlement and to change its physical characteristics to less elastic, and to have more damage and a shorter service life.

In view of this, the author of the present invention has many years of experience in design, development, and production of relevant products and set to find the solutions for the aforementioned deficiencies. After a careful design and evaluation, the present invention with practicality is developed.

SUMMARY OF INVENTION

The present invention intends to solve the aforementioned technical deficiencies of the prior art by providing a silent hub structure.

A silent hub structure comprises a hub housing, an interlocking ring, a detent ring and a cassette base, wherein one side of the hub housing has a hollow assembly slot for installing fixedly the interlocking ring. The outer portion of the interlocking ring has an assembly portion installed inside the hollow assembly slot accordingly; the inner portion of the interlocking ring has a central through-hole slot, wherein the through-hole slot has a detent ring disposed rotatably therethrough. The through-hole slot is internally and circumferentially provided with a plurality of receiving grooves recessed at an equal distance therebetween on the internal wall. Each of these receiving grooves is disposed with a metal roller pin along the axial direction. The depth at the forward-rotating direction side of every receiving groove is smaller than the size of the roller pin to form a clamping portion so that the surface edge of the roller pin exceeds the boundary of the receiving groove to be in contact with the detent ring for stopping the relative movement. A magnetic member is disposed in the interlocking ring near the clamping portion of each of the receiving groove separately. The depth of the backward-rotating direction side of every receiving groove is larger than the size of the roller pin to form a releasing portion. The outer boundary of the detent ring forms a detent ring surface; the inner boundary of the detent ring has a threaded pivot portion. One end of the cassette base has an outer threaded pivot stem and is coupled through the pivot stem to move with the detent ring. The aforementioned structure forms a silent hub structure.

In comparison to the effectiveness of the prior art, the interlocking ring of the hub structure of the present invention can draw the roller pin to reset to its original position through the use of the magnetic member. The hub structure of the present invention is simple and easy to be assembled. Therefore, the production cost is reduced significantly thus to increase the economic effectiveness. The inner space of the receiving groove of the interlocking ring is solely used for the rolling displacement of the roller pin, so that the displacement of the roller pin becomes apparent and smooth. In addition, the magnetic member is inserted in the interlocking ring near the edge of the clamping portion of the receiving groove. Therefore, the use of the magnetic member not only can draw and reset the roller pin precisely but also can prevent the structure from being damaged, resulting in the increase of the service life of the structure. Thus, the present invention meets the key requirement of practicality.

The present invention will become more fully understood from the detailed description given herein below for illustration only which thus does not limit the present invention.

DETAILED DESCRIPTION OF PREFERRED EMBODIMENT

Figure 1:
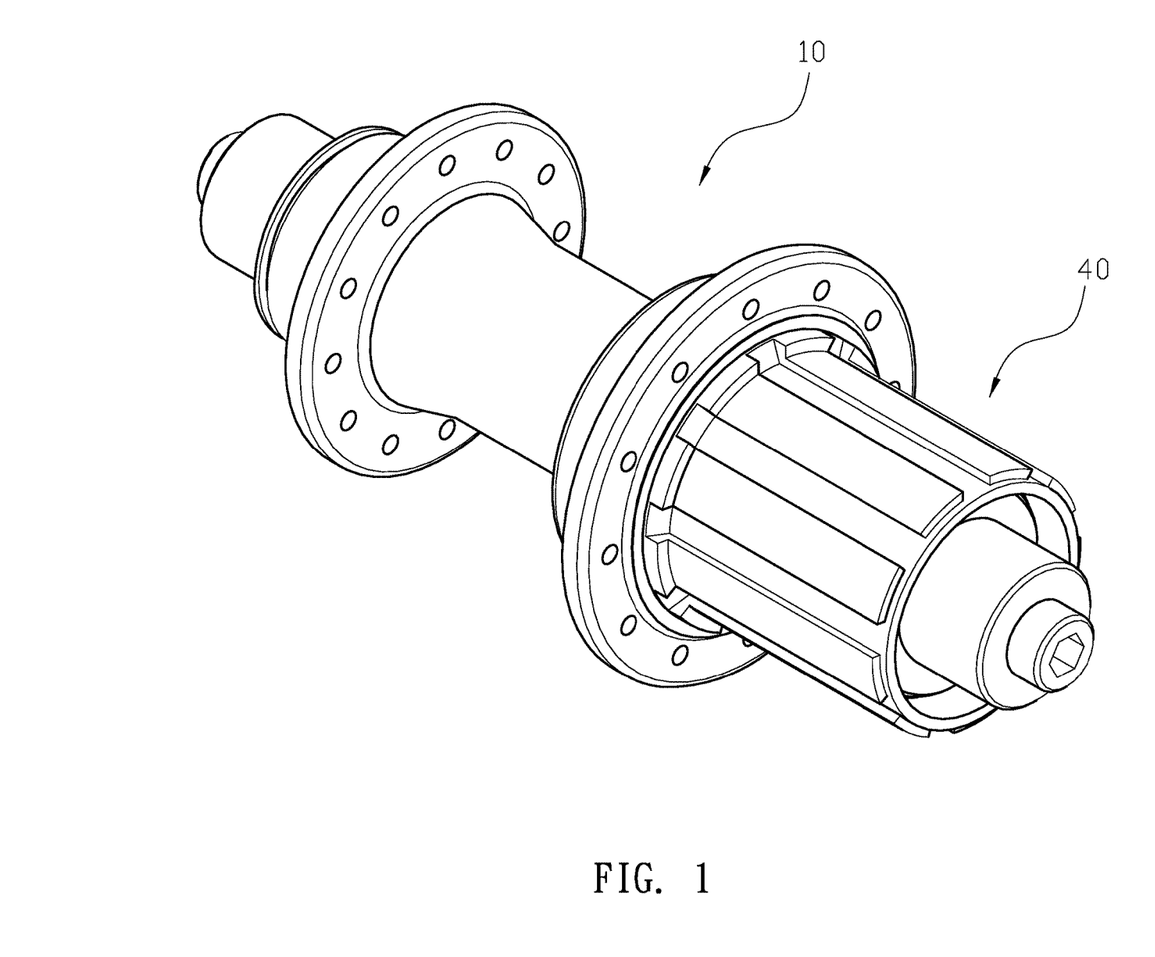
FIG. 1 is a three dimensional schematic diagram of the present invention.
Figure 2:
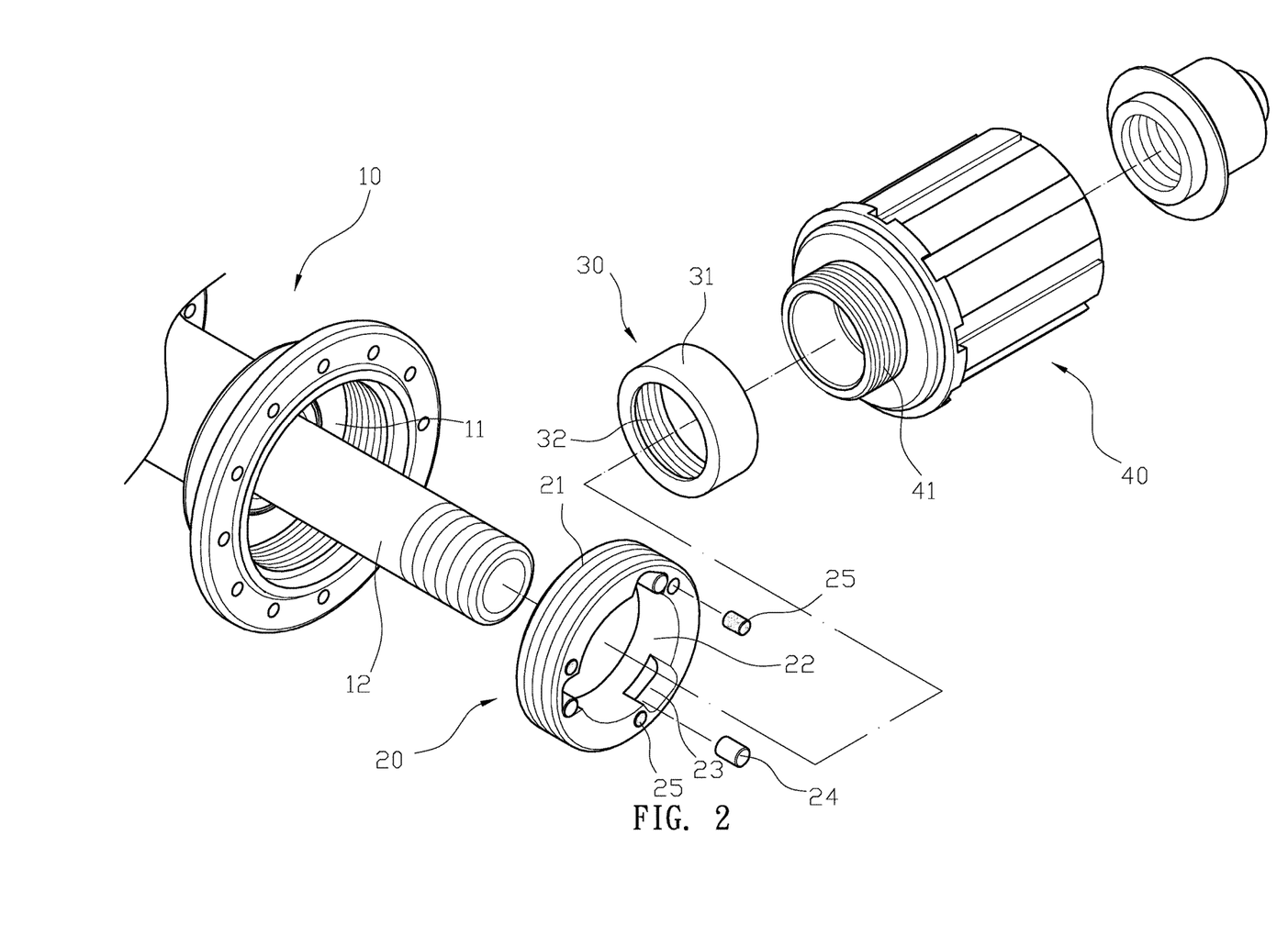
FIG. 2 is a partial exploded three dimensional view of the present invention.
Figure 3:
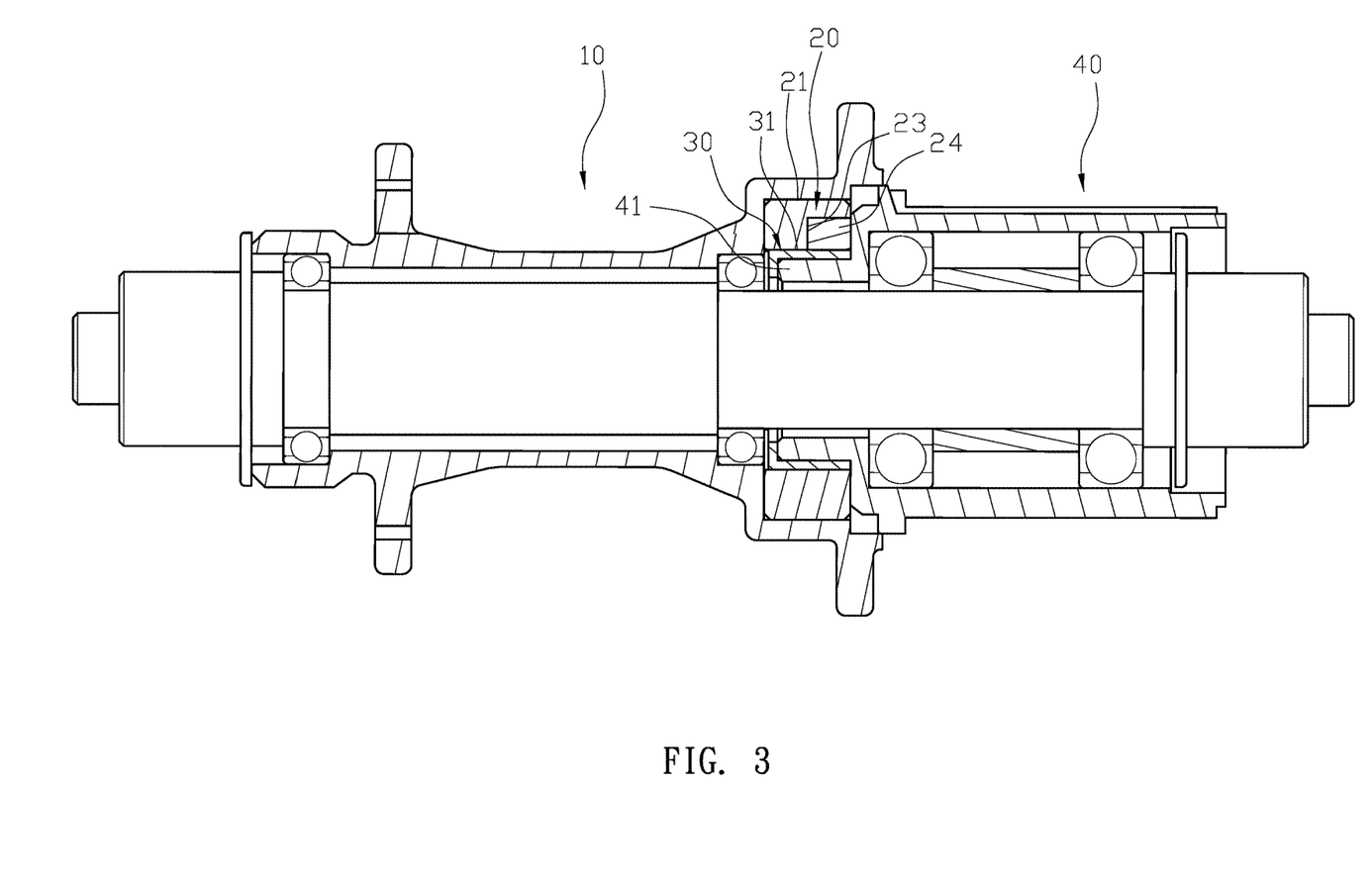
FIG. 3 is a cross-sectional composite view of the present invention.
Figure 4:
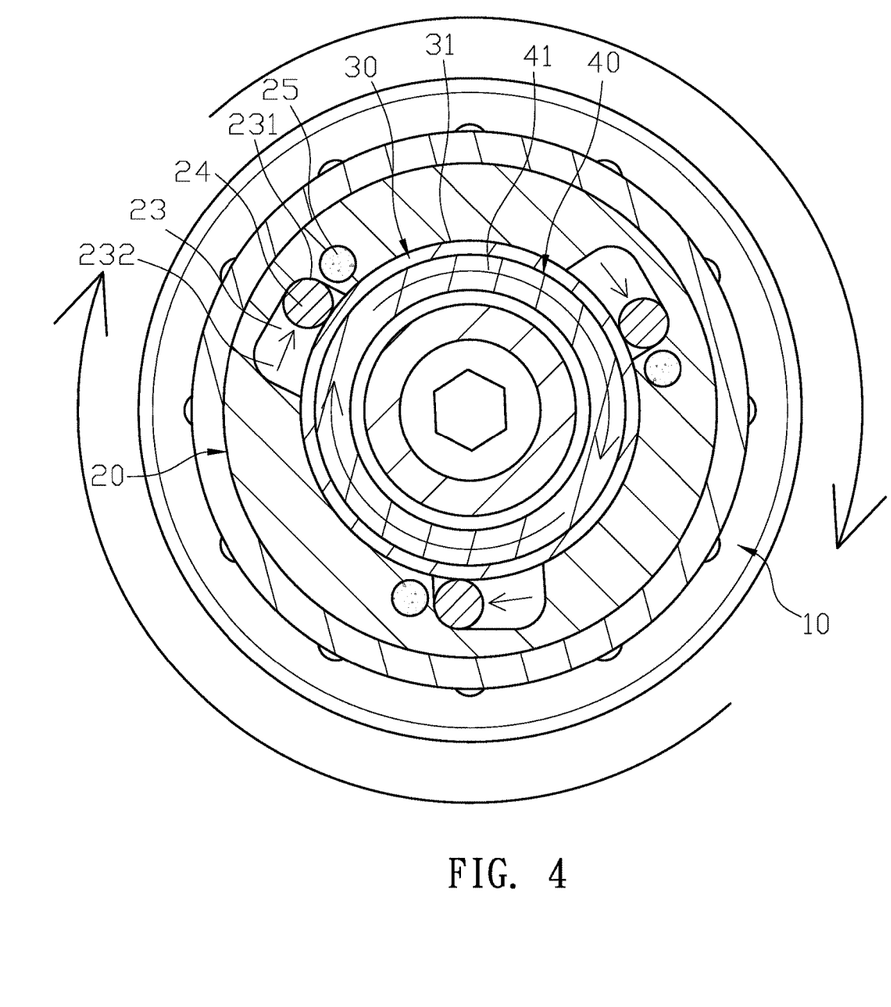
FIG. 4 is a sectional view of the roller pin and the detent ring of the present invention in an engagement mode.
Figure 5:
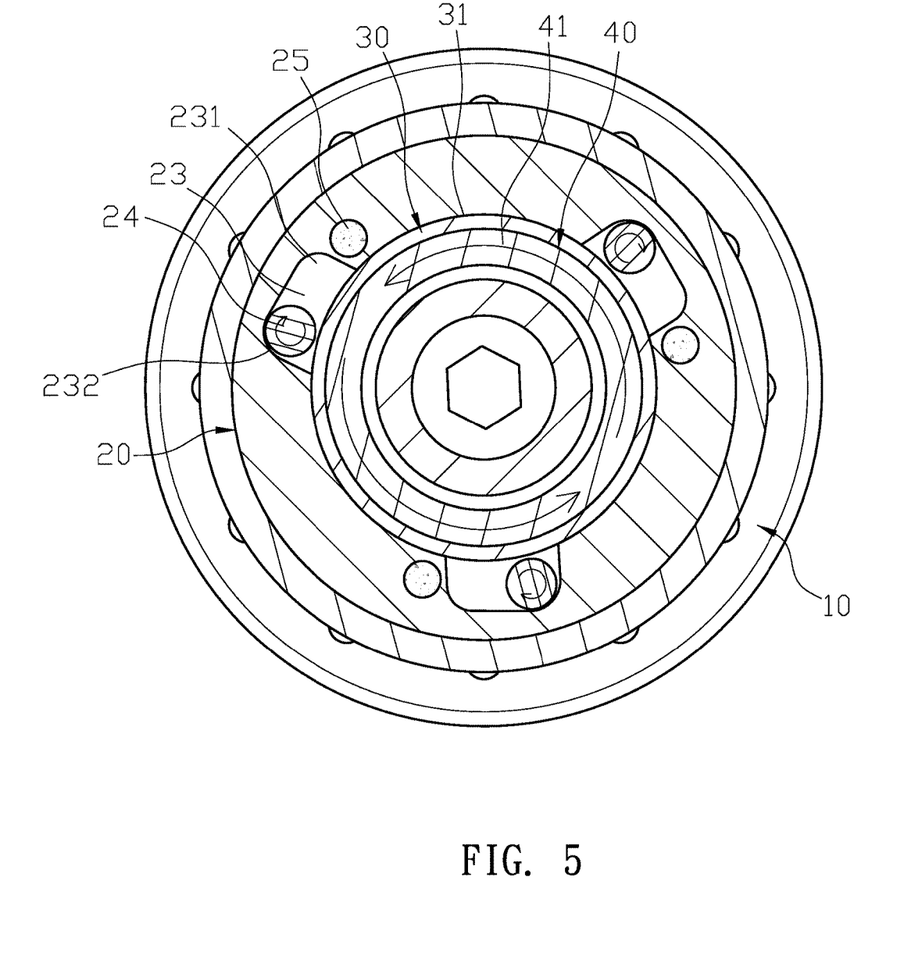
FIG. 5 is a sectional view of the roller pin and the detent ring of the present invention released from the engagement mode.

First, please refer to the illustrations of FIG. 1 and FIG. 2 together with FIG. 3 and FIG. 4. A silent hub structure comprises a hub housing 10, an interlocking ring 20, a detent ring 30 and a cassette base 40, wherein one side of the hub housing 10 has a hollow assembly slot 11 for installing fixedly the interlocking ring 20. The outer portion of the interlocking ring 20 has an assembly portion 21 installed inside the hollow assembly slot 11 via a screw locking method; the inner portion of the interlocking ring 20 has a central through-hole slot 22, wherein the through-hole slot 22 has a detent ring 30 disposed rotatably therethrough. The through-hole slot 22 is internally and circumferentially provided with a plurality of receiving grooves 23 recessed at an equal distance therebetween on the internal wall. Each of these receiving grooves 23 is disposed with a metal roller pin 24 along the axial direction. The depth at the forward-rotating direction side of every receiving groove 23 is smaller than the size of the roller pin 24 to form a clamping portion 231 so that the surface edge of the roller pin 24 exceeds the boundary of the receiving groove 23 to be in contact with the detent ring 30 for stopping the relative movement. A magnetic member 25 is disposed in the interlocking ring 20 near the clamping portion 231 of every receiving groove 23 separately. The depth of the backward-rotating direction side of every receiving groove 23 is larger than the size of the roller pin 24 to form a releasing portion 232. The outer boundary of the detent ring 30 forms a detent ring surface 31 wherein the material strength of the detent ring surface 31 is greater than that of the roller pin 24. The inner boundary of the detent ring 30 has a threaded pivot portion 32. One end of the cassette base 40 has an outer threaded pivot stem 41 and is coupled through the pivot stem 41 to move with the detent ring 30.

Please refer to FIG. 2, FIG. 3, and FIG. 4 for the composite of the structure. The hub housing 10 is installed with a rotational shaft 12 which is further assembled with an interlocking ring 20 by screw locking into the hollow assembly slot 11. Each of these receiving grooves 23 in the interlocking ring 20 is disposed with a roller pin 24 along the axial direction. A magnetic member 25 is disposed in the interlocking ring 20 near the clamping portion 231 of each of the receiving groove 23 separately. These roller pins 24 all have magnetic attraction properties to ease the absorption limitation of the magnetic member 25. The detent ring 30 is disposed inside the through-hole slot 22 of the interlocking ring 20 via rotation. The detent ring surface 31 on the outer of the detent ring is in contact with the roller pin 24; the detent ring 30 is also coupled to the pivot stem 41 of the cassette base 40 through the pivot portion 32 on the inner boundary of the detent ring 30 via the screw locking method. Thus, the detent ring 30 rotates synchronously driven by the cassette base 40; the cassette base 40 is set onto the shaft 12 and can rotate in idle. The aforementioned structure forms a silent hub structure.

For the actual applications of the structure, please refer to FIG. 3 and FIG. 4. The hub structure can have a cassette (not shown in the diagram) installed thereon through the cassette base 40. When the rider steps on the pedals, the pedal cranks drive the cassette to move and drive the cassette base 40 to rotate. At this moment, when the rider steps on the pedals in the forward-rotating direction to move forward, the cassette base 40 is forward rotating and driving the detent ring 30 together synchronously. Since the roller pin 24 inside the receiving groove 23 of the interlocking ring 20 is drawn toward the clamping portion 231 at the forward-rotating direction side by the magnetic attraction of the magnetic member 25, the forward-rotating detent ring 30 drives the roller pin 24 to have a displacement in the forward direction, causing the roller pin 24 to completely clamp into the clamping portion 231 of the receiving groove 23. Due to the magnetic attraction force of the magnetic member 25, the roller pin 24 stops rolling and is closely in contact with the detent ring surface 31 of the detent ring 30 to be in an engagement mode, so that the interlocking ring 20 can be driven to rotate and reach a synchronous rotational movement with the hub housing 10. As a result, the bicycle is moving forward.

Figure 6:
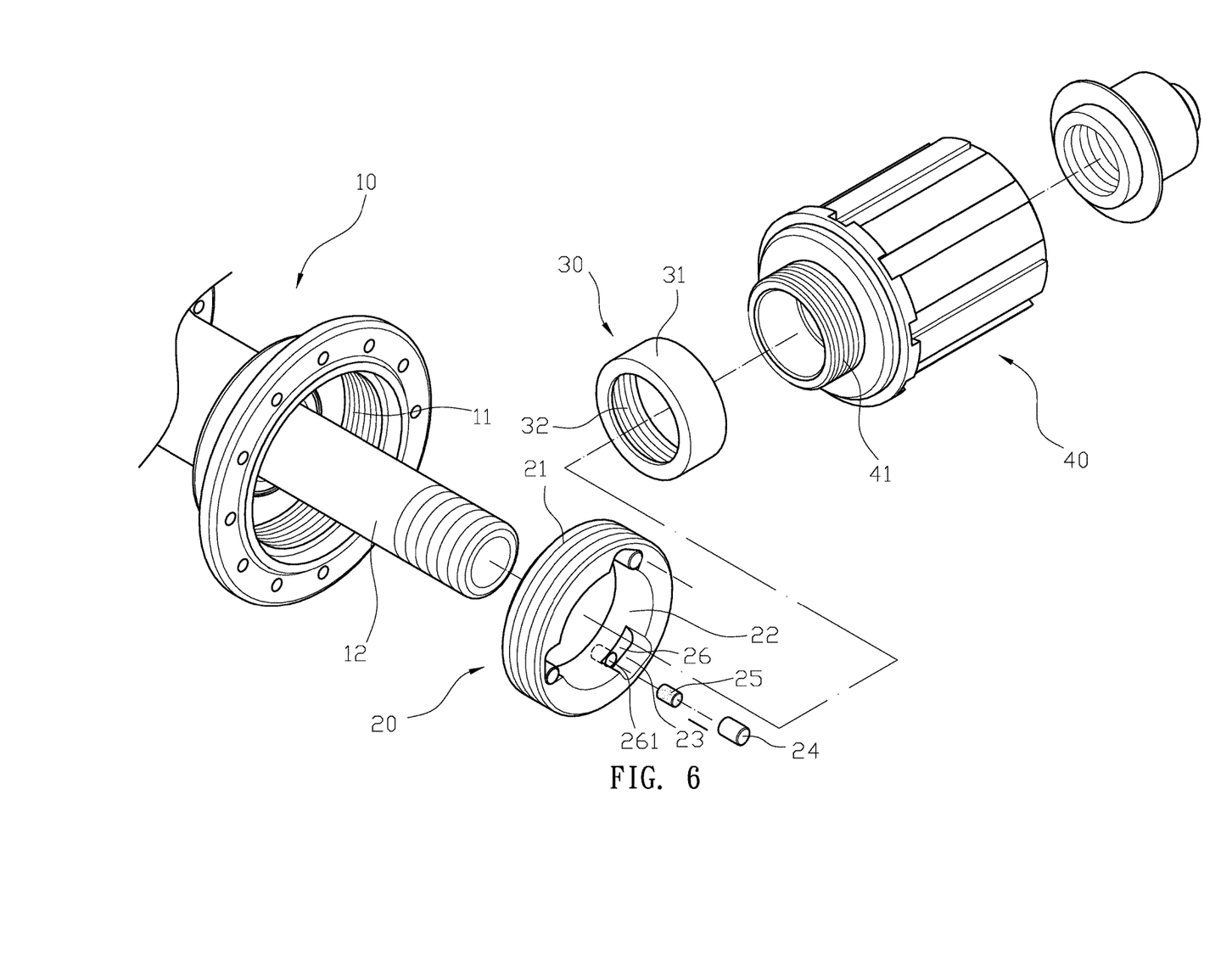
FIG. 6 is a partial exploded three dimensional view of one other embodiment of the present invention.

Please refer to FIG. 6. When the rider steps on the pedals in a backward rotating direction, the cassette base 40 is backward rotating and driving the detent ring 30 together synchronously. At the same time, since the detent ring surface 31 of the detent ring 30 is closely in contact with the roller pin 24, the roller pin 24 is driven away from the clamping portion 231 of the receiving groove 23 toward the direction of the releasing portion 232 where the depth of the receiving groove 23 is larger than the size of the roller pin 24, causing the roller pin 24 to be released from the engagement mode with the detent ring 30. Meanwhile, the roller pin 24 is in a rolling mode while rotating in between the receiving groove 23 and the detent ring 30, resulting in no mechanical output while the pedals moving in the backward rotating direction to drive the cassette base 40 to rotate backward in idle within the through-hole slot 22 of the interlocking ring 20. Thus, when the rider is pedaling backward while riding forward, since the hub housing 10 and the interlocking ring 20 are still in the forward-rotating move, the bicycle is sliding in a free spinning mode.

Furthermore, when the rider stops pedaling during the bicycle ride, the roller pins 24 will be pulled away from the clamping portion 231 reversely by the friction from the still detent ring 30 and released from the engagement mode. Since the hub housing 10 and the interlocking ring 20 are still in the forward-rotating move, causing the hub housing 10 to rotate in idle with respect to the detent ring 30, so that the bicycle is sliding in a free spinning mode.

However, when the bicycle is sliding in a free spinning mode as mentioned above and the rider begins to step on the pedals again, the cassette base 40 again drives the detent ring 30 to rotate forward. The roller pins 24 are driven by the detent ring 30 to move toward the forward-rotating direction side of the receiving groove 23; at the same time, the roller pins 24 are drawn by the magnetic members 25 to engage tightly inside the clamping portions 231 of the receiving groove 23, so that the roller pins 24 and the detent ring 30 are in contact with one another closely and back to the engagement mode. Meanwhile, as the rider continuously steps on the pedals, the hub housing 10 rotates synchronously and further engages into the forward movement of the bicycle thus to avoid pedaling in idle from happening and thus to enhance the rider's safety.

Figure 7:
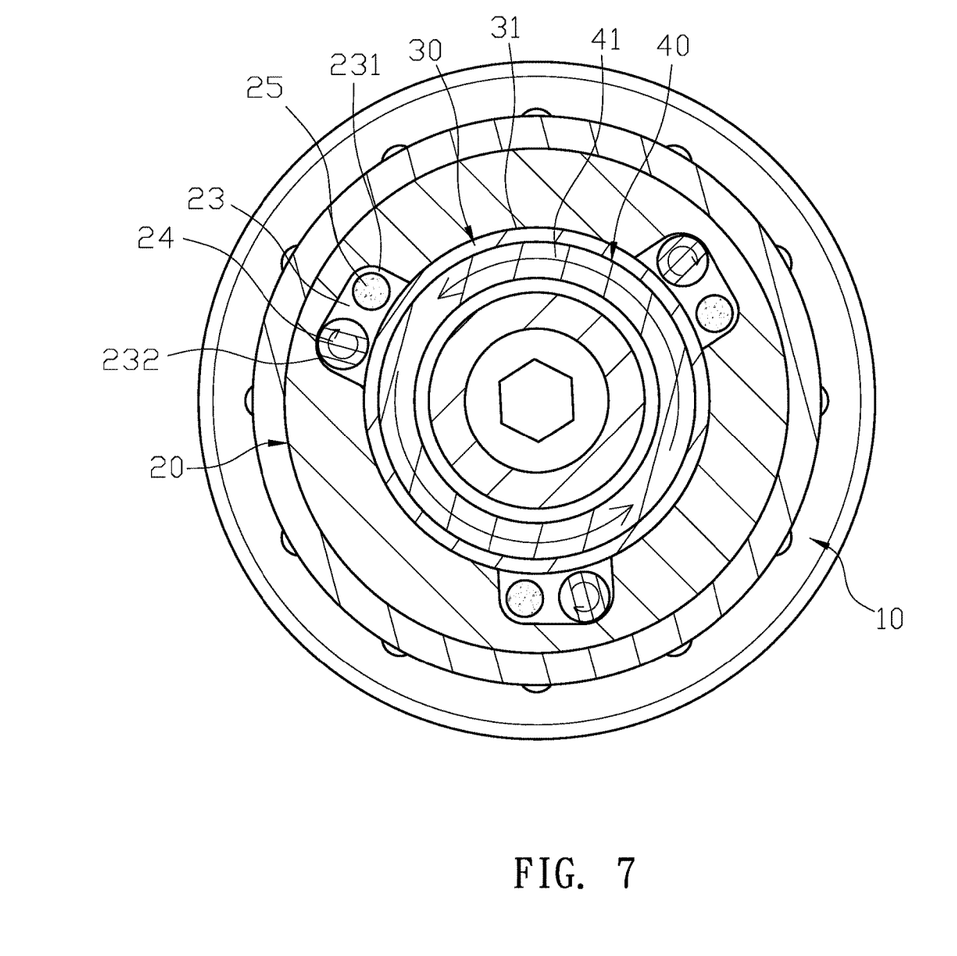
FIG. 7 is a cross-sectional view of one other embodiment of the present invention.

Next, one other embodiment of the structure is illustrated. Please refer to FIG. 6 and FIG. 7. The receiving groove 23 of the interlocking ring 20 that does not penetrate the interlocking ring 20 and has an engaging step portion 26. The clamping portion 231 of the receiving groove 23 has a through hole 261 set on the engaging step portion 26 wherein the magnetic member 25 is disposed into the through hole and the magnetic member 25 is located relatively at the bottom of the clamping portion 231 of the receiving groove 23 for enhancing the magnetic force to the roller pin 24.

Figure 8:
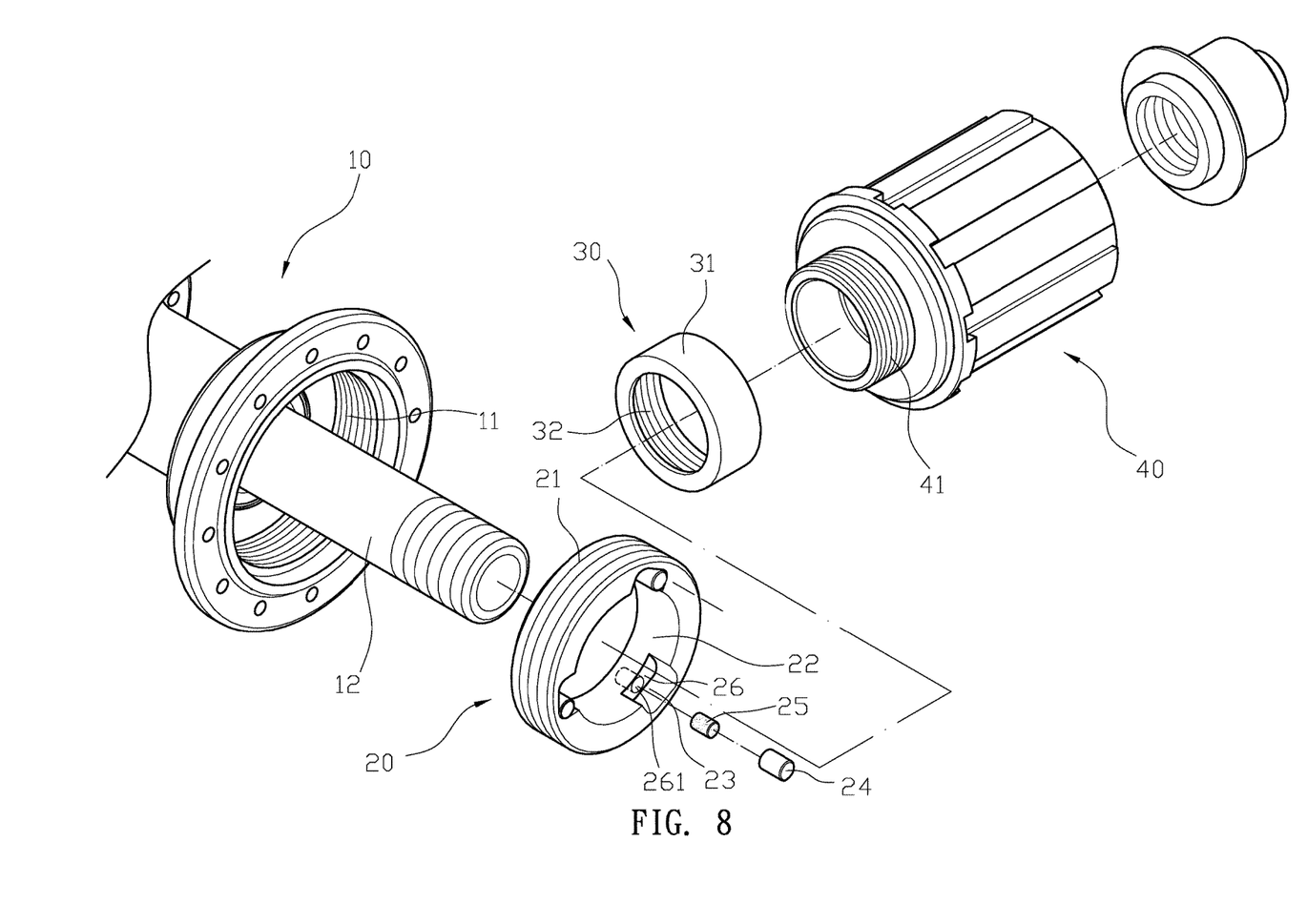
FIG. 8 is a partial exploded three dimensional view of another embodiment of the present invention
Figure 9:
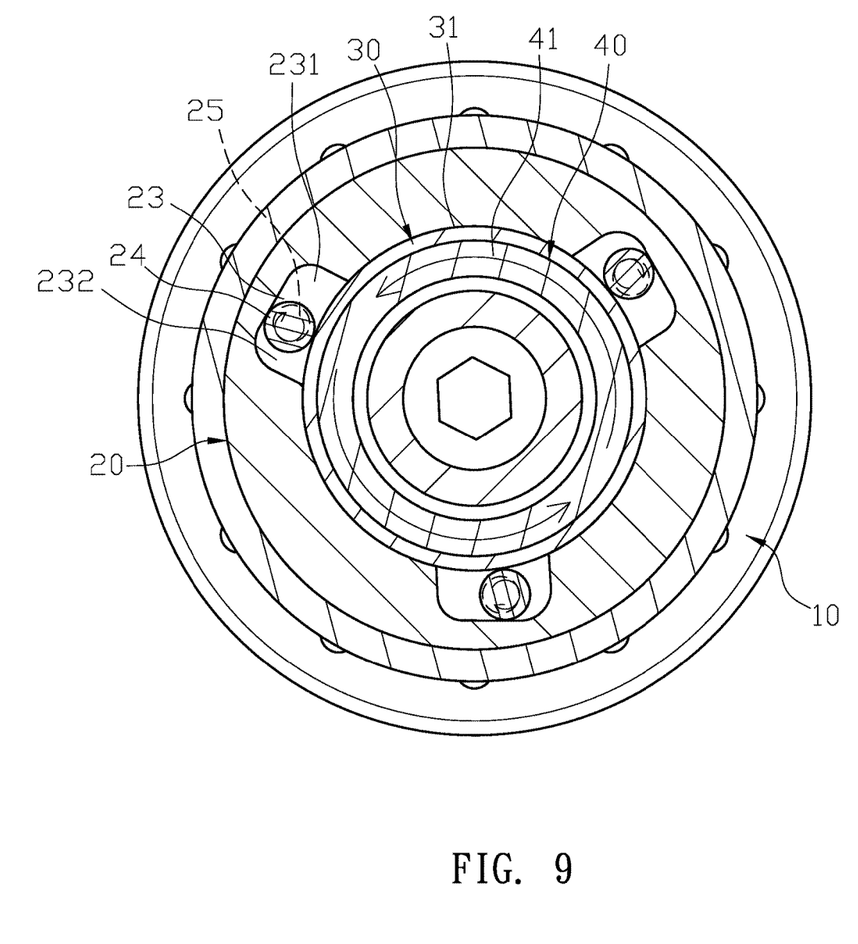
FIG. 9 is a cross-sectional view of another embodiment of the present invention.

Again, another embodiment of the structure is illustrated. Please refer to FIG. 8 and FIG. 9. The receiving groove 23 has a through hole 261 set on the engaging step portion 26 that is located in between the clamping portion 231 and the releasing portion 232, wherein the magnetic member 25 is disposed into the through hole and the magnetic member 25 is confined between the clamping portion 231 and the releasing portion 232 of the receiving groove 23. When the rider stops pedaling the bicycle or steps the pedals in the backward rotating direction, not only the roller pin 24 is pulled and released by the detent ring 30, but also the magnetic member 25 actually draws the roller pin 24 out by its magnetic attraction force, thus aiding the roller pin 24 to be released and reset quickly. In addition, when the roller pin 24 is drawn onto the magnetic member 25, the roller pin still maintains the friction contact with the detent ring surface 31 of the detent ring 30 in order to ensure that the rider pedals forward until the roller pin 24 is engaged in driving rotation.

According to the structures described in the aforementioned embodiments, the present invention has the following effectiveness: the interlocking ring 20 of the hub structure can draw the roller pin 24 to reset to its original position through the use of the magnetic member 25. The hub structure of the present invention is simple and easy to be assembled. Therefore, the production cost is reduced significantly thus to increase the economic effectiveness. The inner space of the receiving groove 23 of the interlocking ring 20 is solely used for the rolling displacement of the roller pin 24, so that the displacement of the roller pin 24 becomes apparent and smooth. In addition, the magnetic member 25 is inserted in the interlocking ring 20 near the edge of the clamping portion 231 of the receiving groove 23. Therefore, the use of the magnetic member not only can draw and reset the roller pin 24 precisely but also can prevent the structure from being damaged, resulting in the increase of the service life of the structure. Thus, the present invention meets the key requirement of practicality.

In summary, the present invention has presented a breakthrough structural design and an invention with enhanced contents. The present invention also has made excellent progress and presented high practicality compared to other products of same categories. Meanwhile, after searching domestic and foreign publications related to the technology of this type of structure, it is concluded that no identical or similar structures exist in the patents approved prior to the submission of the application of the present invention. Thus, the present invention meets the key requirements of "novelty", "progress" and "applicable to industrial use" specified in relevant patent laws and, therefore, hereby the application is submitted.

The aforementioned examples are a few preferred embodiments of the present invention. Therefore, the forms of illustration stated above are not intended to limit the scope of the present invention in any way. Alternative embodiments will become apparent to those skilled in the art to which the present invention pertains without departing from its spirit and scope.

What is claimed is:

1. A silent hub structure, comprising:
   a hub housing, wherein a side of the hub housing has a hollow assembly slot for fixedly installing an interlocking ring, wherein an outer portion of the interlocking ring has an assembly portion installed inside the hollow assembly slot, an inner portion of the interlocking ring having a central through-hole slot defining a smooth internal wall, a detent ring rotatably disposed in the through-hole slot, the through-hole slot comprising a plurality of receiving grooves recessed in the internal wall;
   wherein each receiving groove includes a metal roller pin, a depth at a forward-rotating direction side of each receiving groove being less than a size of the roller pin to form a clamping portion so that a surface edge of each roller pin exceeds a boundary of the receiving groove to contact the detent ring for stopping relative movement;
   a respective magnetic member disposed in the interlocking ring adjacent each of the receiving grooves, a depth of a backward-rotating direction side of each receiving groove being greater than the size of the roller pin to form a releasing portion;
   wherein an outer boundary of the detent ring defines a smooth detent ring surface conformal to the internal wall, and an inner boundary of the detent ring directly radially inward from the detent ring surface has a threaded pivot portion; and
   a cassette base, wherein an end of the cassette base has an outer threaded pivot stem and is coupled through the pivot stem with the threaded pivot portion of the detent ring.

2. The silent hub structure as claimed in claim 1, wherein each receiving groove of the interlocking ring does not penetrate the interlocking ring and has an engaging step portion.

3. The silent hub structure as claimed in claim 2, wherein the clamping portion of each receiving groove has a through hole set on the engaging step portion for accepting the magnetic member.

4. The silent hub structure as claimed in claim 2, wherein each receiving groove has a through hole set on the engaging step portion that is located between the clamping portion and the releasing portion for accepting the magnetic member.

5. The silent hub structure as claimed in claim 1, wherein a material strength of the detent ring surface of the detent ring is greater than that of the roller pins.

6. The silent hub structure as claimed in claim 5, wherein the roller pins all have magnetic attraction properties.

7. The silent hub structure as claimed in claim 1, wherein the pivot portion of the detent ring is coupled to the pivot stem of the cassette base for engaging motion via a screw locking engagement.

8. The silent hub structure as claimed in claim 4, wherein a material strength of the detent ring surface of the detent ring is greater than that of the roller pins.

9. The silent hub structure as claimed in claim 8, wherein the roller pins all have magnetic attraction properties.

* * * * *